(12) United States Patent
Harrison et al.

(10) Patent No.: US 6,758,439 B2
(45) Date of Patent: Jul. 6, 2004

(54) APPARATUSES AND METHODS FOR ATTACHING ENGINE NACELLES TO AIRCRAFT

(75) Inventors: Kenneth M. Harrison, Mukilteo, WA (US); Donald T. Powell, Auburn, WA (US); James R. Schnelz, Seattle, WA (US); Brett D. Whitmer, Everett, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/278,382

(22) Filed: Oct. 22, 2002

(65) Prior Publication Data

US 2004/0094664 A1 May 20, 2004

(51) Int. Cl.[7] .............................. B64C 3/32; B64D 27/18
(52) U.S. Cl. ............................ 244/54; 244/123; 244/36
(58) Field of Search ............................. 244/54, 55, 36, 244/123, 117 R

(56) References Cited

U.S. PATENT DOCUMENTS

| | | | | |
|---|---|---|---|---|
| D202,841 S | * | 11/1965 | Alfred et al. ............... | D12/341 |
| 4,828,204 A | * | 5/1989 | Friebel ........................ | 244/15 |
| 5,443,229 A | * | 8/1995 | O'Brien et al. ............... | 244/54 |
| 5,447,282 A | * | 9/1995 | Durand ........................ | 244/54 |
| 5,810,287 A | * | 9/1998 | O'Boyle et al. ............... | 244/54 |
| 5,842,666 A | * | 12/1998 | Gerhardt et al. .............. | 244/15 |
| 2002/0096598 A1 | * | 7/2002 | Nelson ........................ | 244/15 |

OTHER PUBLICATIONS

Dryden Flight Research Center EC99–45065–6 Photographed 1999, SR–71A, NASA/Dryden, Jim Ross (1 page) http://www.dfrc.nasa.gov/gallery/photo/SR-71/Small/EC99-45065-6.jpg [Accessed Sep. 9, 2002].*
http://pma265.navair.navy.mil/stores/media/photos/000524%20Blue@20Angels.jpg (1 page) [Accessed Aug. 30, 2002].*

* cited by examiner

Primary Examiner—Galen L. Barefoot
(74) Attorney, Agent, or Firm—Perkins Coie LLP

(57) ABSTRACT

Aircraft engine nacelles and methods for structurally attaching them to aircraft structures, such as aircraft wings. In one embodiment, an aircraft engine nacelle is attached to a wing between a trailing edge region of the wing and an aft deck region of the wing. In one aspect of this embodiment, the engine nacelle includes a forward portion having first and second structural attach points offset from each other in a first direction at least generally perpendicular to a central axis of the engine nacelle. The first and second structural attach points can be configured to fixedly attach the engine nacelle to the wing at least proximate to the trailing edge region. In another aspect of this embodiment, the engine nacelle includes a side portion having at least a third structural attach point offset from the first and second structural attach points in a second direction at least generally parallel to the central axis. The third structural attach point can be configured to fixedly attach the engine nacelle to the wing at least proximate to the aft deck region.

37 Claims, 6 Drawing Sheets

APPARATUSES AND METHODS FOR ATTACHING ENGINE NACELLES TO AIRCRAFT

TECHNICAL FIELD

The following disclosure relates generally to aircraft engine nacelles and, more particularly, to apparatuses and methods for attaching engine nacelles to aircraft wings.

BACKGROUND

Propulsion systems for jet aircraft typically include at least one engine housed in an engine nacelle, an inlet positioned forward of the engine nacelle to provide air to the engine, and an outlet positioned aft of the engine nacelle to discharge exhaust gas from the engine. The engine nacelles of these systems can be placed in a number of different positions on different aircraft. For example, some transport aircraft have engine nacelles positioned below the main wing or adjacent to an aft portion of the fuselage. Some military aircraft have twin engine nacelles positioned side by side at the aft end of the fuselage. Often, such military aircraft include flight control surfaces (e.g., rudders and/or elevators) extending outwardly from the engine nacelles.

Regardless of where an engine nacelle is attached to a particular aircraft, the supporting structure must be sufficient to carry the significant loads that are often associated with engine nacelles. These loads can include engine thrust loads as well as inertial loads resulting from the weight of the engine and the nacelle structure. In addition, these loads can include torsional loads resulting from flight control surfaces extending from the nacelle, as well as torsional loads resulting from a potential engine rotor seizure.

Because of the significant loads associated with engine nacelles, engine nacelles are typically attached to engines or pylons. Engines and pylons are typically attached to major structural portions of the airframe, such as the wing-box or the fuselage. Structural portions such as these typically have enough cross-sectional depth to efficiently carry the high torsional loads often associated with engine nacelles. By "efficiently" it is meant that these structural portions can carry the high torsional loads without requiring a significant amount of structural reinforcement to prevent excessive deflection or structural failure.

For performance and other reasons, however, it may be desirable to attach an engine nacelle adjacent to a relatively thin portion of an airframe, such as an aft deck region of a wing. In this situation, the thin portion typically requires a significant amount of structural reinforcement to prevent excessive deflection or structural failure under the high nacelle loads. This reinforcement can add a significant amount of weight to the airframe and adversely affect performance, as measured by fuel efficiency, passenger capacity, maneuverability, and weight and balance.

SUMMARY

Aspects of the invention are directed to aircraft engine nacelles and methods for structurally attaching them to aircraft. In one aspect, an engine nacelle for use with an aircraft includes an interior portion, a forward portion, and a side portion. The interior portion can be configured to house an engine at least generally aligned with a central axis. The forward portion can be configured to fixedly attach the engine nacelle to the wing and transfer torsional loads from the engine nacelle into the wing. These torsional loads can include torsional loads acting at least generally parallel to the central axis. The side portion can be configured to fixedly attach the engine nacelle to the wing at least generally aft of the trailing edge region and transfer vertical and lateral loads into the wing. These vertical and lateral loads can include loads acting at least generally perpendicular to the central axis.

In another aspect of the invention, the aircraft can include a wing having a trailing edge region and an aft deck region. The aft deck region can extend aft of the trailing edge region and inboard of the trailing edge region. The forward portion of the engine nacelle can be configured to be attached at least proximate to the trailing edge region, and the side portion of the engine nacelle can be configured to be attached at least proximate to the aft deck region.

In a further aspect of the invention, a method for structurally attaching an engine nacelle to an aircraft having a wing with a trailing edge region includes providing a forward nacelle portion having first and second structural attach points. In this aspect of the invention, the engine nacelle can include an interior portion configured to house an engine at least generally aligned with a central axis, and the first and second structural attach points being offset from each other in a first direction at least generally perpendicular to the central axis. The method can further include providing a side nacelle portion positioned aft of the forward nacelle portion and having at least a third structural attach point. The third structural attach point can be offset from the first and second structural attach points in a second direction at least generally parallel to the central axis. The method can also include attaching the first and second structural attach points to the wing to transfer torsional loads from the engine nacelle into the wing, and attaching the third structural attach point to the aircraft aft of the trailing edge region of the wing to transfer at least vertical and lateral loads from the engine nacelle into the aircraft. In a further aspect of the invention, the wing can include a wing spar, and attaching the first and second structural attach points to the wing can include fixedly attaching the first and second structural attach points at least proximate to the wing spar.

DETAILED DESCRIPTION

Figure 1:
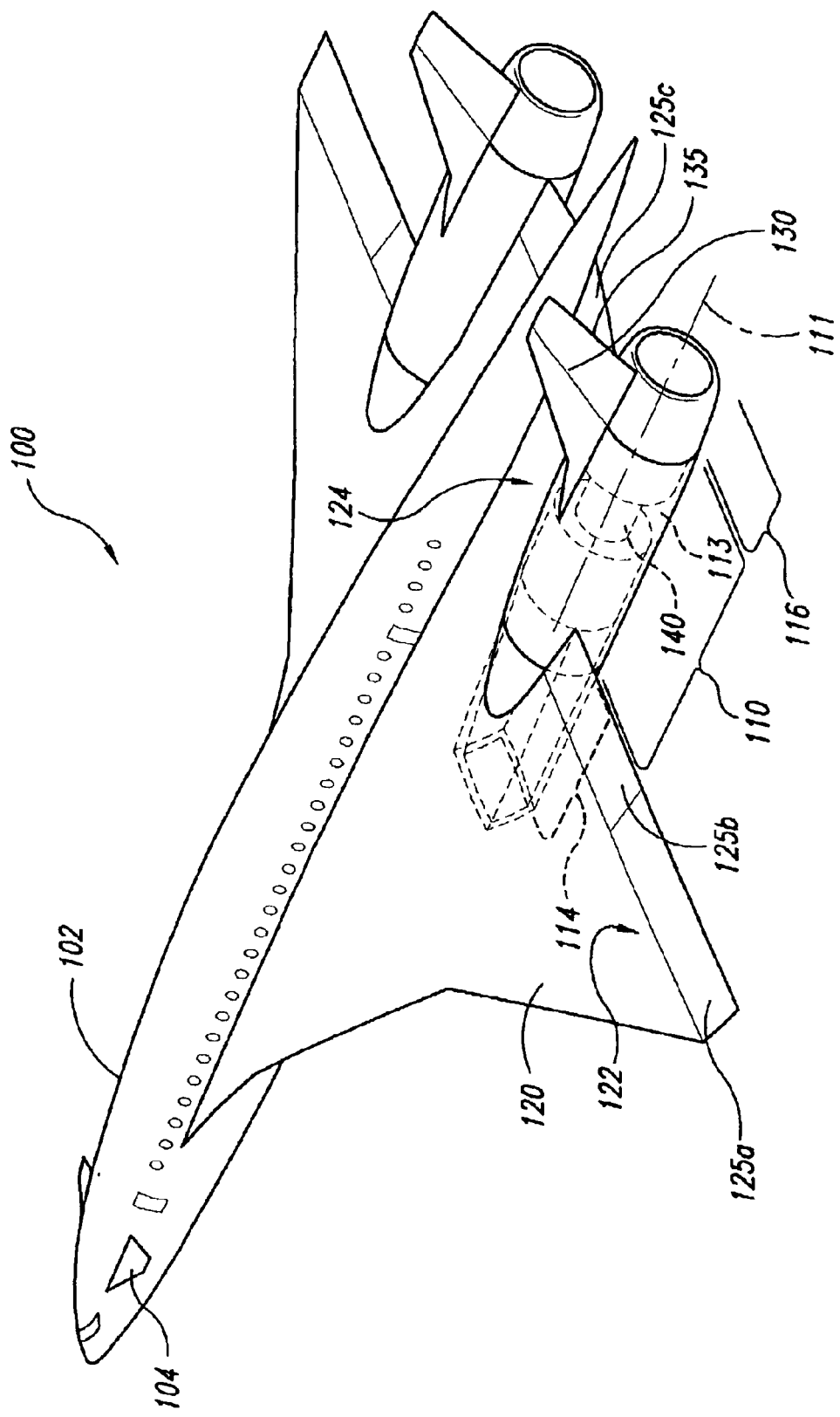
FIG. 1 is a partially hidden isometric view of an aircraft having an engine nacelle configured in accordance with an embodiment of the invention.

The following disclosure describes aircraft engine nacelles, such as engine nacelles attached to aircraft wings, and associated methods for structurally attaching such engine nacelles to aircraft. Certain specific details are set forth in the following description and in FIGS. 1–6 to provide a thorough understanding of various embodiments of the invention. Certain specific details describing well-known structures and systems often associated with aircraft, however, are not set forth in the following disclosure to avoid unnecessarily obscuring the description of the various embodiments of the invention. In addition, those of ordinary skill in the relevant art will understand that they can practice embodiments of the invention without several of the details described below. Further, any dimensions, angles, and other specifications shown in the figures are merely illustrative of particular embodiments of the invention. Accordingly, other embodiments of the invention can have other dimensions, angles, and specifications without departing from the spirit or scope of the present invention.

In the drawings, identical reference numbers identify identical or at least generally similar elements. To facilitate the discussion of any particular element, the most significant digit or digits of any reference number refer to the figure in which that element is first introduced. For example, element 110 is first introduced and discussed with reference to FIG. 1.

FIG. 1 is a partially hidden isometric view of an aircraft 100 having an engine nacelle 110 configured in accordance with an embodiment of the invention. In one aspect of this embodiment, the aircraft 100 includes a fuselage 102, a first or main wing 120, and a smaller second wing 104. The main wing 120 can be fixedly attached to an aft portion of the fuselage 102, and the smaller second wing 104 can be fixedly attached to the fuselage 102 forward of the main wing 120. In another aspect of this embodiment, the main wing 120 can include a trailing edge region 122 and an aft deck region 124. The aft deck region 124 can extend aft of the trailing edge region 122 between the trailing edge region 122 and the fuselage 102. The trailing edge region 122 and the aft deck region 124 can include movable control surfaces 125a–c for controlling the aircraft 100 during flight.

In a further aspect of this embodiment, the engine nacelle 110 is fixedly attached to the main wing 120 between the trailing edge region 122 and the aft deck region 124. The engine nacelle 110 can include an interior portion 113 configured to house an engine 140, such as a jet engine, at least generally aligned with a central axis 111. In another aspect of this embodiment, the aircraft 100 further includes an inlet 114 extending forward of the engine nacelle 110, and an outlet 116 extending aft of the engine nacelle 110. The inlet 114 can be positioned beneath the main wing 120 in flow communication with the interior portion 113 to provide air to the engine 140, which in turn discharges exhaust gas through the outlet 116. In other embodiments, the inlet 114 can have other positions relative to the main wing 120. For example, in another embodiment, the inlet 114 can be positioned at least generally above the main wing 120.

In a further aspect of this embodiment, the aircraft 100 also includes a fin 130 extending at least generally upward from the engine nacelle 110. The fin 130 can include a movable control surface 135 for controlling the aircraft 100 during flight. Accordingly, aerodynamic loads generated by the fin 130 and/or the control surface 135, as well as inertial and thrust loads generated by the engine 140, are transferred through the engine nacelle 110 into the trailing edge region 122 and the aft deck region 124 of the main wing 120.

Figure 2:
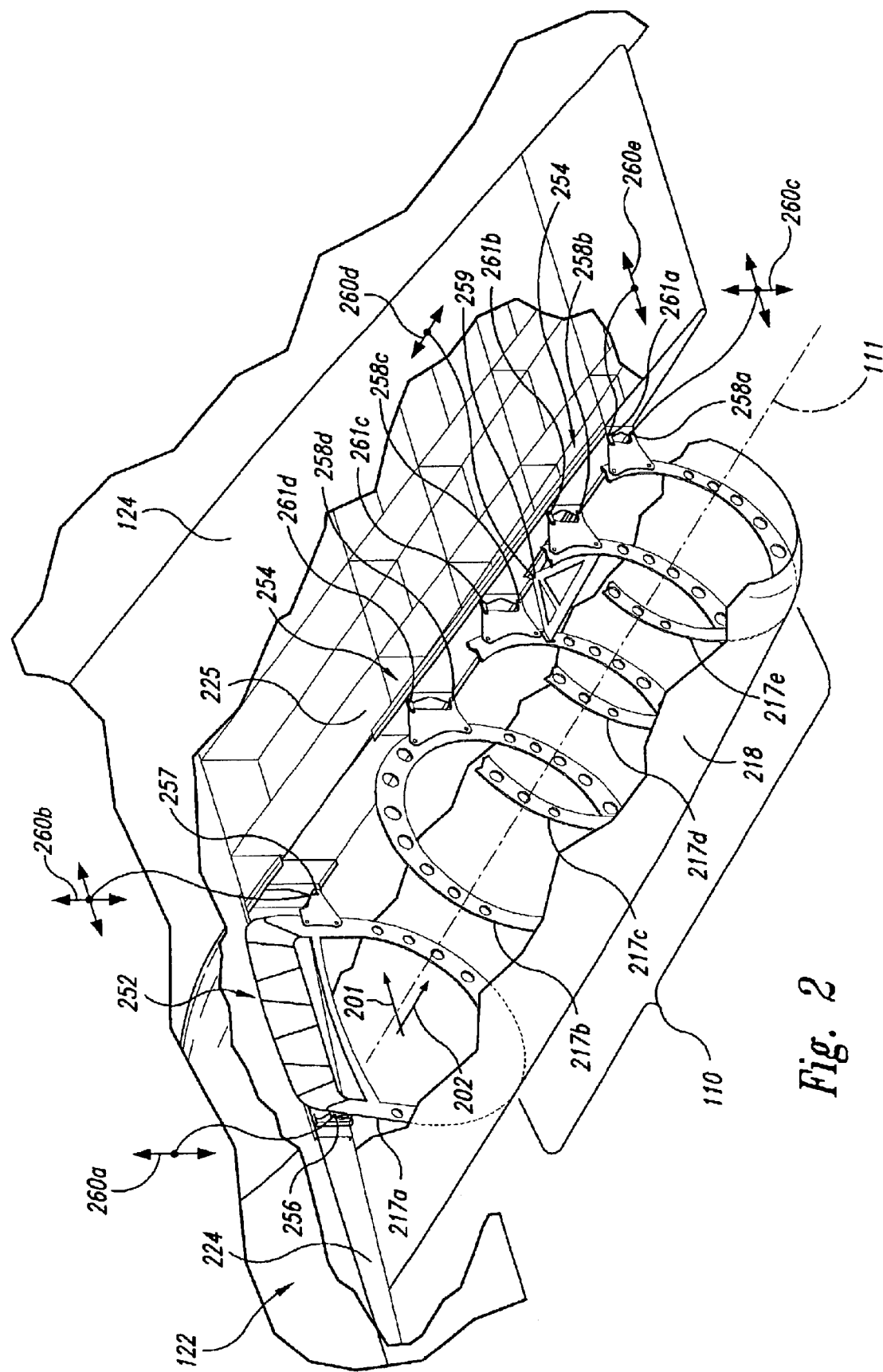
FIG. 2 is an enlarged, partially cutaway isometric view of a portion of a main wing of FIG. 1 with the engine nacelle attached to a trailing edge region and an aft deck region in accordance with an embodiment of the invention.

FIG. 2 is an enlarged, partially cutaway isometric view of a portion of the main wing 120 of FIG. 1 with the engine nacelle 110 attached to the trailing edge region 122 and the aft deck region 124 in accordance with an embodiment of the invention. A number of components associated with the engine nacelle 110, such as the fin 130 and the engine 140, are not shown in FIG. 2 for purposes of clarity. In one aspect of this embodiment, the engine nacelle 110 includes an outer skin 218 and a plurality of frames 217 (shown as an inlet frame 217a, a first engine bay frame 217b, a second engine bay frame 217c, a third engine bay frame 217d, and a fourth engine bay frame 217e) extending aft in axial alignment with the central axis 111. The outer skin 218 can be attached to the frames 217 to provide the engine nacelle 110 with a semi-monocoque structure sufficient to transfer significant torsional loads from the engine nacelle 110 into the rear wing spar 224. These torsional loads can include torsional loads from the fin 130 and the engine 140 acting at least generally parallel to the central axis 111.

In other embodiments, the engine nacelle 110 can include structural members other than the frames 217 and the outer skin 218 in manners other than that shown in FIG. 2. For example, in another embodiment, the engine nacelle 110 can include longitudinal members spanning between the frames 217 to carry longitudinal loads. In yet another embodiment, the engine nacelle 110 can include one or more composite panels replacing the outer skin 218 and/or the frames 217.

In one embodiment, the outer skin 218 and the frames 217 at least partially define a forward portion 252 and a side portion 254 of the engine nacelle 110. The forward portion 252 can be positioned adjacent to a rear wing spar 224 of the trailing edge region 122, and the side portion 254 can be positioned adjacent to an edge member 225 of the aft deck region 124. In a further aspect of this embodiment, the forward portion 252 can be configured to transfer torsional load components acting about the central axis 111 from the engine nacelle 110 into the rear wing spar 224. For example, in the illustrated embodiment the forward portion 252 includes a first attach point 256 and a second attach point 257 positioned at least proximate to the inlet frame 217a. The first attach point 256 and the second attach point 257 can be offset from each other in a first direction 201 at least generally perpendicular to the central axis 111. Further, the first attach point 256 can be configured to transfer vertical load components acting perpendicular to the central axis 111 into the rear wing spar 224, as shown by arrows 260a, and the second attach point 257 can be configured to transfer both vertical and lateral load components acting perpendicular to the central axis 111 into the rear wing spar 224, as shown by arrows 260b. Accordingly, the first attach point 256 and the second attach point 257 can efficiently transfer torsional loads acting at least generally parallel to the central axis 111 into the rear wing spar 224. Such torsional loads can originate at the fin 130 and the engine nacelle 110.

In another aspect of this embodiment, the side portion 254 can be configured to transfer vertical and lateral load components acting perpendicular to the central axis 111, and axial load components acting parallel to the central axis 111, from the engine nacelle 110 into the edge member 225. For example, in the illustrated embodiment, the side portion 254 includes a third attach point 258a positioned at least proximate to the fourth engine bay frame 217e, and a fourth attach point 259 positioned between the second engine bay frame 217c and the third engine bay frame 217d. Both the third attach point 258a and the fourth attach point 259 can be offset from the rear wing spar 224 in a second direction 202 at least generally parallel to the central axis 111. In a further aspect of this embodiment, the third attach point 258a (like the second attach point 257) can be configured to transfer both vertical and lateral loads acting perpendicular to the central axis 111 into the edge member 225, as shown by arrows 260c. Further, the fourth attach point 259 can be configured to transfer axial loads acting parallel to the central axis 111, such as axial thrust loads from the engine 140, into the edge member 225, as shown by arrows 260d.

The first attach point 256, the second attach point 257, the third attach point 258a, and the fourth attach point 259 represent one structural system for attaching the engine nacelle 110 to the rear wing spar 224 and the edge member 225 in accordance with embodiments of the invention. In other embodiments, other attach points can be added to the system to provide, for example, structural redundancy and/or more efficient load distribution. For example, as shown in FIG. 2, in another embodiment the side portion 254 can further include a fifth attach point 261a vertically offset from the third attach point 258a. In one aspect of this embodiment, the fifth attach point 261a is configured to transfer only lateral loads from the engine nacelle 110 into the edge member 225, as shown by arrows 260e. Accordingly, the third attach point 258a and the fifth attach point 261a can create a couple capable of transferring a bending moment from the engine nacelle 110 into the edge member 225. Thus, this couple can provide a redundant load path that supplements the first attach point 256 and the second attach point 257 for carrying the torsional loads associated with the engine nacelle 110.

In a further aspect of this embodiment, the side portion 254 can include additional attach points 258b and 261b, 258c and 261c, and 258d and 261d, positioned adjacent to the third engine bay frame 217d, the second engine bay frame 217c, and the first engine bay frame 217b, respectively. The attach points 258b–d can be at least generally similar in structure and function to the third attach point 258a, and the attach points 261b–d can be at least generally similar in structure and function to the fifth attach point 261a. Accordingly, the sets of attach points 258 and 261 can provide redundant load paths for carrying the torsional, vertical, and lateral loads associated with the engine nacelle 110.

One feature of embodiments of the invention as illustrated in FIG. 2 is that a significant portion of the torsional loads associated with the engine nacelle 110 are carried by the rear wing spar 224 instead of the aft deck region 124. An advantage of this feature is that the rear wing spar 224, unlike the aft deck region 124, is typically strong enough to carry these torsional loads without requiring a significant amount of structural reinforcement. This reduces the weight impact associated with attaching the engine nacelle 110 adjacent to the aft deck region 124.

Another feature of embodiments of the invention as illustrated in FIG. 2 is that the engine nacelle 110 is not fully structurally integrated with the main wing 120. By this it is meant that the engine nacelle 110 is only attached to the main wing 120 at a number of discrete locations (for example, the first attach point 256, the second attach point 257, the third attach point 258a, and the fourth attach point 259). In contrast, if the engine nacelle 110 were fully integrated with the main wing 120, then the outer skin 218, for example, would be integrally attached to both the main wing 120 and the engine nacelle 110. An advantage of this feature is that the engine nacelle 110 can be easily installed or removed by connecting or disconnecting, respectively, the discrete attach points.

Figure 3:
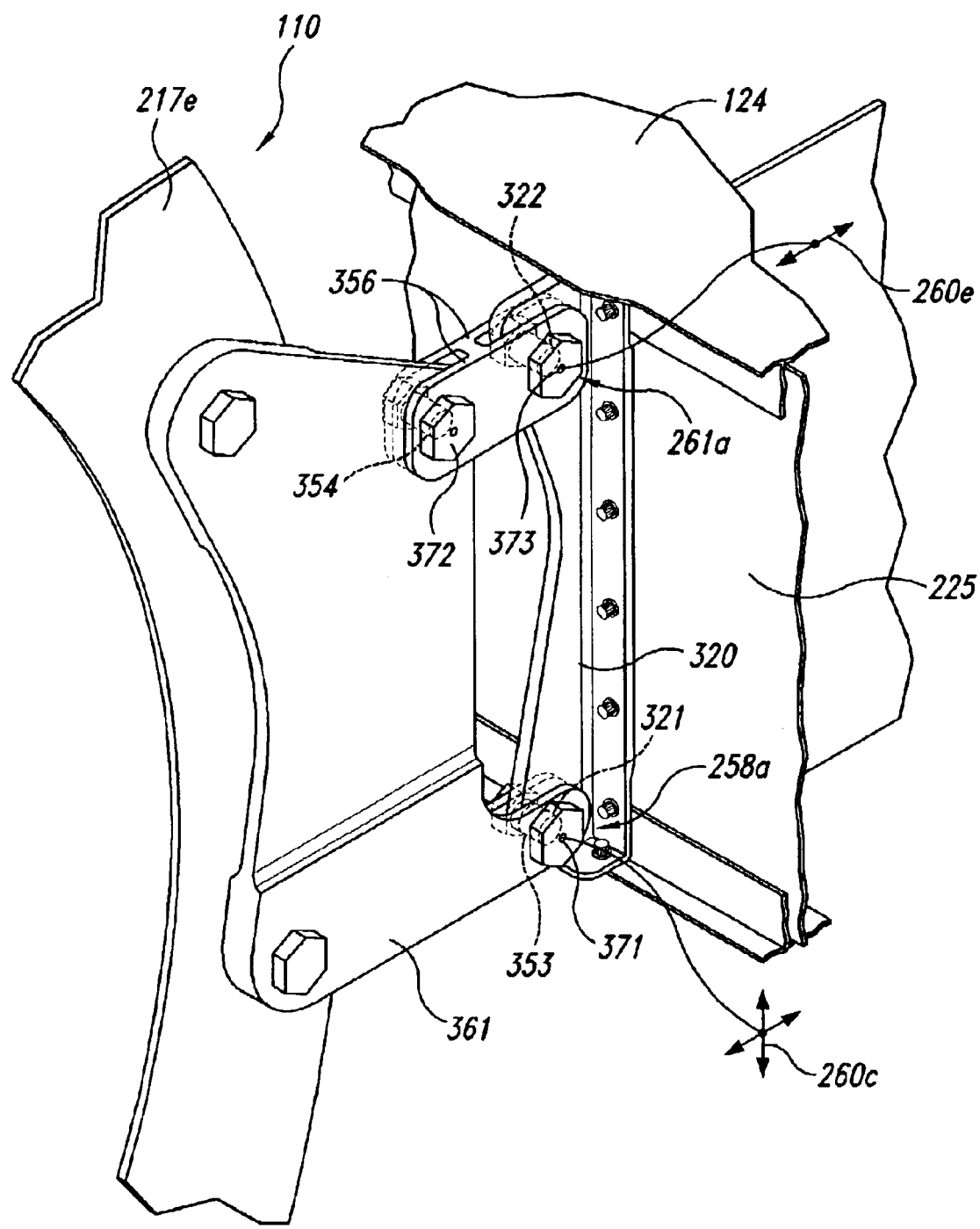
FIG. 3 is an enlarged partially hidden isometric view of a portion of the engine nacelle and aft deck region of FIG. 2 illustrating a third attach point configured in accordance with an embodiment of the invention.

FIG. 3 is an enlarged partially hidden isometric view of a portion of the engine nacelle 110 and the aft deck region 124 of FIG. 2 illustrating the third attach point 258a configured in accordance with an embodiment of the invention. In one aspect of this embodiment, the aft deck region 124 includes a double-pin fitting 320 fixedly attached to the edge member 225 adjacent to the fourth engine bay frame 217e. The double-pin fitting 320 can include a first pin bore 321 located at the third attach point 258a and a second pin bore 322 located at the fifth attach point 261a. In another aspect of this embodiment, the engine nacelle 110 can include a first nacelle bracket 361 fixedly attached to the fourth engine bay frame 217e adjacent to the double-pin fitting 320. The first nacelle bracket 361 can include a third pin bore 353 and a fourth pin bore 354 vertically offset from the third pin bore 353. In a further aspect of this embodiment, the first nacelle bracket 361 can be fixedly attached to the double-pin fitting 320 by a first pin 371 inserted through the first pin bore 321 and the third pin bore 353, a second pin 372 inserted through a link 356 and the fourth pin bore 354, and a third pin 373 inserted through the link 356 and the second pin bore 322. Attaching the first nacelle bracket 361 to the double-pin fitting 320 in this manner enables the third attach point 258a to carry both vertical and lateral loads, as shown by the arrows 260c, and enables the fifth attach point 261a to carry only lateral loads, as shown by the arrows 260e. In addition, this attachment enables the third attach point 258a and the fifth attach point 261a to carry bending moments from the engine nacelle 110 into the aft deck region 124.

The configuration of the first nacelle bracket 361 and the double-pin fitting 320 illustrated in FIG. 3 is one method of structural attachment that can be used to fixedly attach the side portion 254 of the engine nacelle 110 to the aft deck region 124 in accordance with embodiments of the invention. Accordingly, in other embodiments, other bracket and/or fitting configurations can be used without departing from the spirit or scope of the present invention. For example, in another embodiment, the link 356 can be omitted and the first nacelle bracket 361 can be attached directly to the double-pin fitting 320. In this embodiment, the second pin bore 322 can be vertically elongated to limit the capability of the fifth attach point 261a to lateral loads. In a further embodiment where movement capability is not required, the fifth attach point 261a can be omitted and the double-pin fitting 320 can accordingly become a single-pin fitting. Although not shown in FIG. 3, the third engine bay frame 217d, the second engine bay frame 217c, and the first engine bay frame 217b (all shown in FIG. 2) can also be fixedly attached to the edge member 225 in a manner that is at least generally similar to that described above with reference to FIG. 3 for the fourth engine bay frame 217e.

Figure 4:
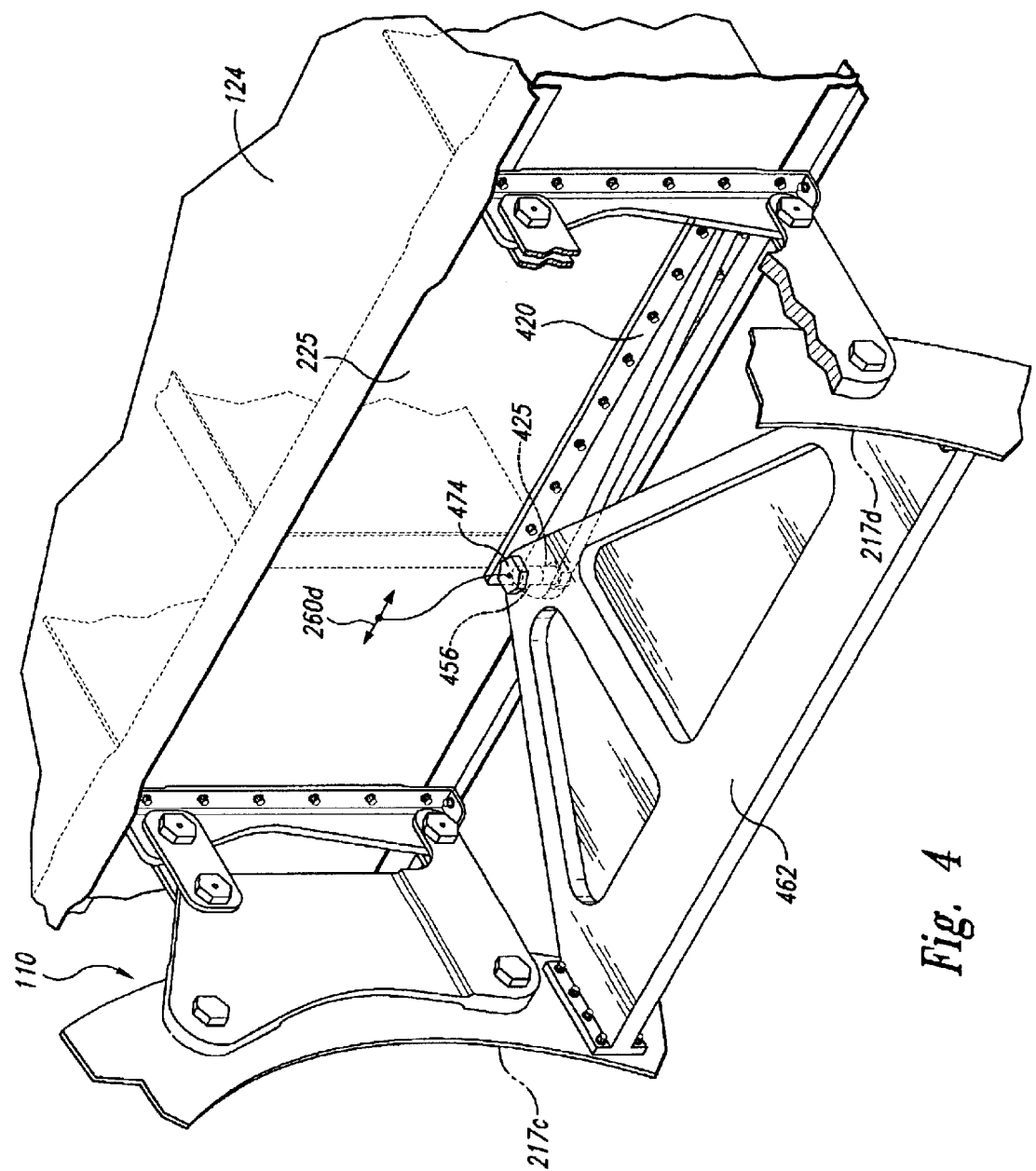
FIG. 4 is an enlarged partially hidden isometric view of a portion of the engine nacelle and aft deck region of FIG. 2 illustrating a fourth attach point configured in accordance with an embodiment of the invention.

FIG. 4 is an enlarged partially hidden isometric view of a portion of the engine nacelle 110 and the aft deck region 124 of FIG. 2 illustrating the fourth attach point 259 configured in accordance with an embodiment of the invention. In one aspect of this embodiment, the aft deck region 124 includes a single-pin thrust link 420 fixedly attached to the edge member 225 adjacent to the second engine bay frame 217c and the third engine bay frame 217d. The thrust link 420 can include a fifth pin bore 425 located at the fourth attach point 259. In another aspect of this embodiment, the side portion 254 of the engine nacelle 110 includes a second nacelle bracket 462 positioned adjacent to the thrust link 420. The second nacelle bracket 462 can include a sixth pin bore 456 configured to receive a fourth pin 474 extending through the fifth pin bore 425 to fixedly attach the second nacelle bracket 462 to the thrust link 420. Accordingly, attaching the second nacelle bracket 462 to the thrust link 420 in this manner enables the second nacelle bracket 462 to transfer axial loads, such as axial thrust loads from the engine 140, into the aft deck region 124, as shown by the arrows 260d. In other embodiments, the second nacelle bracket 462 and the thrust link 420 can have other configurations capable of transferring thrust loads without departing from the spirit or scope of the present invention. For example, in another embodiment, the side portion 254 can include two or more brackets similar to the second nacelle bracket 462 to provide redundant load paths for transferring axial loads.

Figure 5:
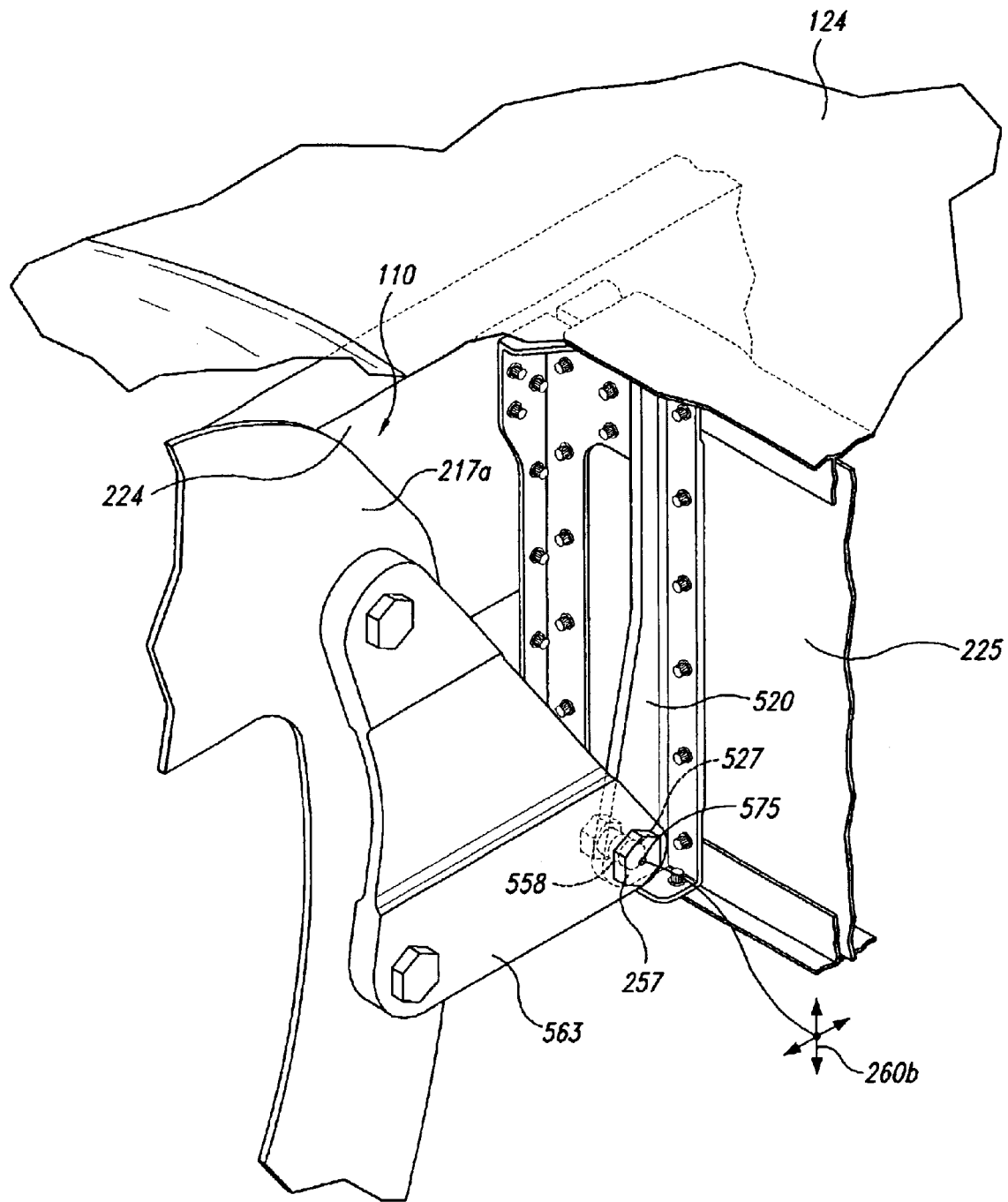
FIG. 5 is an enlarged partially hidden isometric view of a portion of the engine nacelle, the trailing edge region, and the aft deck region of FIG. 2 illustrating a second attach point configured in accordance with an embodiment of the invention.

FIG. 5 is an enlarged partially hidden isometric view of a portion of the engine nacelle 110 and the aft deck region 124 of FIG. 2 illustrating the second attach point 257 configured in accordance with an embodiment of the invention. In one aspect of this embodiment, the aft deck region 124 includes a single-pin fitting 520 fixedly attached to the edge member 225 adjacent to the inlet frame 217a and at least proximate to the rear wing spar 224. The single-pin fitting 520 can include a seventh pin bore 527 located at the second attach point 257. In another aspect of this embodiment, the forward portion 252 of the engine nacelle 110 includes a third nacelle bracket 563 fixedly attached to the inlet frame 217a adjacent to the single-pin fitting 520. The third nacelle bracket 563 can include an eighth pin bore 558 configured to receive a fifth pin 575 extending through the seventh pin bore 527 to fixedly attach the third nacelle bracket 563 to the single-pin fitting 520. Accordingly, attaching the third nacelle bracket 563 to the single-pin fitting 520 in this manner enables the third nacelle bracket 563 to transfer both vertical and lateral loads from the engine nacelle 110 into the rear wing spar 224, as shown by the arrows 260b. In other embodiments, the third nacelle bracket 563 and the single-pin fitting 520 can have other configurations capable of transferring vertical and lateral loads without departing from the spirit or scope of the present invention. For example, in another embodiment, the seventh pin bore 527 and the eighth pin bore 558 can be aligned vertically instead of horizontally as shown in FIG. 5.

Figure 6:
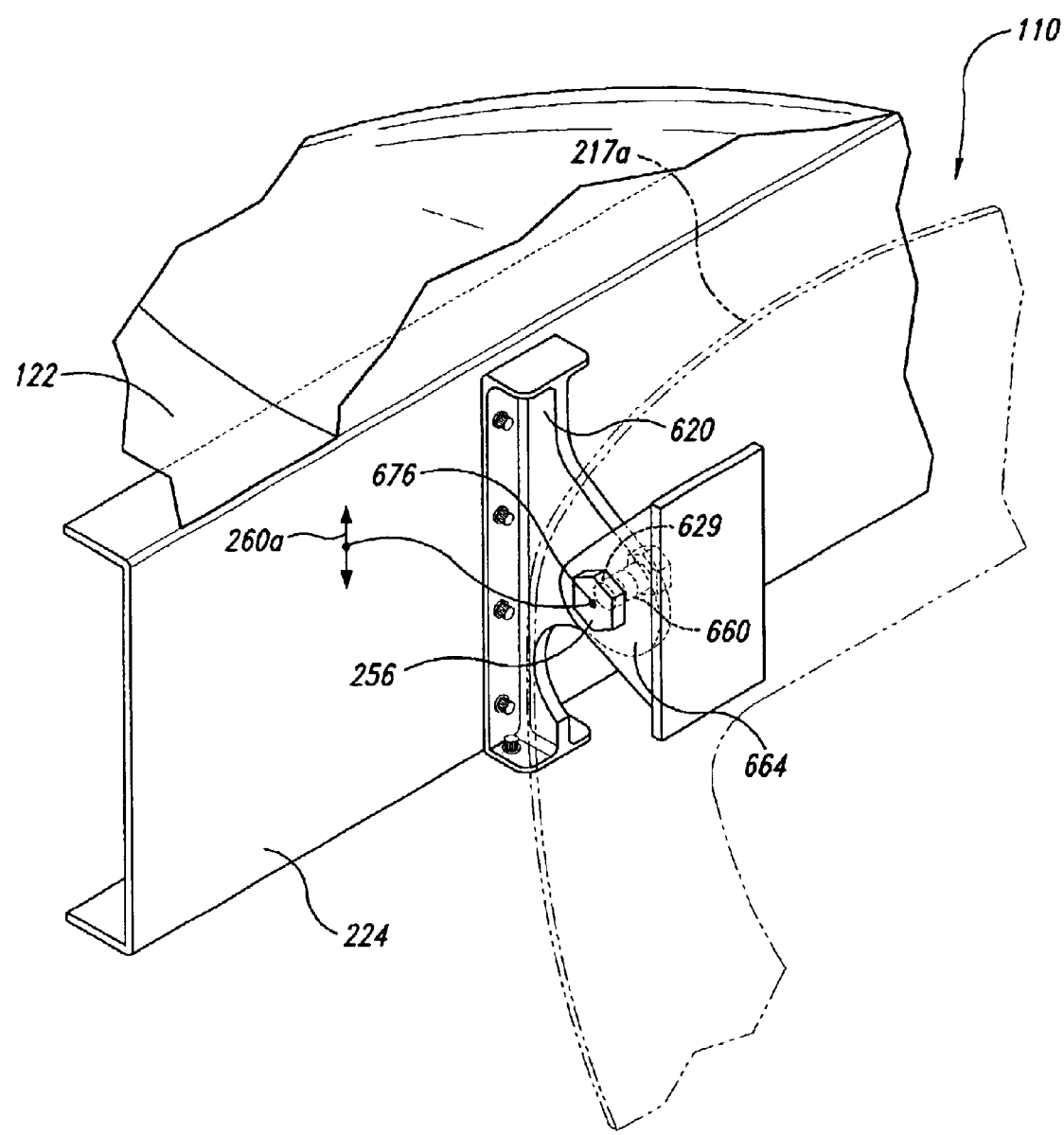
FIG. 6 is an enlarged partially hidden isometric view of a portion of the engine nacelle and trailing edge region of FIG. 2 illustrating a first attach point configured in accordance with an embodiment of the invention.

FIG. 6 is an enlarged partially hidden isometric view of a portion of the engine nacelle 110 and the trailing edge region 122 of FIG. 2 illustrating the first attach point 256 configured in accordance with an embodiment of the invention. In one aspect of this embodiment, the trailing edge region 122 includes a single-pin fitting 620 fixedly attached to the rear wing spar 224 adjacent to the inlet frame 217a. The single-pin fitting 620 can include a ninth pin bore 629 located at the first attach point 256. In another aspect of this embodiment, the forward portion 252 of the engine nacelle 110 includes a fourth nacelle bracket 664 fixedly attached to the inlet frame 217a adjacent to the single-pin fitting 620. The fourth nacelle bracket 664 can include a tenth pin bore 660 configured to receive a sixth pin 676 extending through the ninth pin bore 629 to fixedly attach the fourth nacelle bracket 664 to the single-pin fitting 620. Accordingly, attaching the fourth nacelle bracket 664 to the single-pin fitting 620 in this manner enables the fourth nacelle bracket 664 to transfer vertical loads from the engine nacelle 110 into the rear wing spar 224, as shown by the arrows 260a. In other embodiments, the fourth nacelle bracket 664 and the single-pin fitting 620 can have other configurations capable of transferring vertical loads without departing from the spirit or scope of the present invention. For example, in another embodiment, the ninth pin bore 629 and the tenth pin bore 660 can be aligned vertically instead of horizontally as shown in FIG. 6.

From the foregoing, it will be appreciated that specific embodiments of the invention have been described herein for purposes of illustration, but that various modifications may be made without departing from the spirit or scope of the present invention. For example, although the present disclosure describes apparatuses and methods for attaching engine nacelles to aircraft main wings, in other embodiments, the apparatuses and methods described can be equally employed to attach engine nacelles to other aircraft structures, such as a tail surface. Accordingly, the invention is not limited except as by the appended

We claim:

1. An engine nacelle for use with an aircraft having a wing with a trailing edge region, the engine nacelle comprising:
   an interior portion having a central axis, the interior portion configured to house an engine at least generally aligned with the central axis;
   a forward portion configured to fixedly attach the engine nacelle to the wing and transfer at least approximately all of a torsional load component from the engine nacelle to the wing, the torsional load component acting about an axis at least generally parallel to the central axis; and
   a side portion configured to fixedly attach the engine nacelle to the wing at least generally aft of the trailing edge region, the side portion being further configured to transfer vertical and lateral load components to the wing, the vertical and lateral load components acting in directions at least generally perpendicular to the central axis.

2. The engine nacelle of claim 1 wherein the wing includes an aft deck region extending aft of the trailing edge region inboard of the trailing edge region, and wherein the engine nacelle is configured to be attached to the wing between the trailing edge region and the aft deck region.

3. The engine nacelle of claim 1 wherein the wing includes an aft deck region extending aft of the trailing edge region inboard of the trailing edge region, wherein the forward portion of the engine nacelle is configured to be attached at least proximate to the trailing edge region, and wherein the side portion of the engine nacelle is configured to be attached at least proximate to the aft deck region.

4. The engine nacelle of claim 1 wherein the wing of the aircraft includes a rear wing spar and the forward portion of the engine nacelle is configured to be fixedly attached at least proximate to the rear wing spar.

5. The engine nacelle of claim 1 wherein the side portion is further configured to transfer an axial load component to the wing, wherein the axial load component includes a thrust load from the engine.

6. An engine nacelle for use with an aircraft having a wing with a trailing edge region, the engine nacelle comprising:
   an interior portion having a central axis, the interior portion configured to house an engine at least generally aligned with the central axis;
   a forward portion configured to fixedly attach the engine nacelle to the wing and transfer a torsional load component from the engine nacelle to the wing, the torsional load component acting about an axis at least generally parallel to the central axis, wherein the forward portion includes first and second single-pin fittings configured to transfer the torsional load component to the wing; and
   a side portion configured to fixedly attach the engine nacelle to the wing at least generally aft of the trailing edge region, the side portion being further configured to transfer vertical and lateral load components to the wing, the vertical and lateral load components acting in directions at least generally perpendicular to the central axis.

7. An engine nacelle for use with an aircraft having a wing with a trailing edge region, the engine nacelle comprising:
- an interior portion having a central axis, the interior portion configured to house an engine at least generally aligned with the central axis;
- a forward portion configured to fixedly attach the engine nacelle to the wing and transfer a torsional load component from the engine nacelle to the wing, the torsional load component acting about an axis at least generally parallel to the central axis; and
- a side portion configured to fixedly attach the engine nacelle to the wing at least generally aft of the trailing edge region, the side portion being further configured to transfer vertical and lateral load components to the wing, the vertical and lateral load components acting in directions at least generally perpendicular to the central axis, wherein the side portion includes at least one double-pin fitting configured to transfer the vertical and lateral load components to the wing.

8. An engine nacelle for use with an aircraft having a wing with a trailing edge region, the engine nacelle comprising:
- an interior portion having a central axis, the interior portion configured to house an engine at least generally aligned with the central axis;
- a forward portion configured to fixedly attach the engine nacelle to the wing and transfer a torsional load component from the engine nacelle to the wing, the torsional load component acting about an axis at least generally parallel to the central axis; and
- a side portion configured to fixedly attach the engine nacelle to the wing at least generally aft of the trailing edge region, the side portion being further configured to transfer vertical and lateral load components to the wing, the vertical and lateral load components acting in directions at least generally perpendicular to the central axis, wherein the side portion includes at least one single-pin fitting configured to transfer an axial load component to the wing, wherein the axial load includes a thrust load from the engine.

9. The engine nacelle of claim 1, further comprising an aerodynamic control surface extending from the engine nacelle at least generally perpendicular to the central axis.

10. The engine nacelle of claim 1, further comprising an aerodynamic fin extending at least generally vertically from the engine nacelle.

11. An engine nacelle for use with an aircraft having a wing with a rear wing spar, wherein the engine nacelle is configured to be attached to the aircraft at least generally aft of the rear wing spar, the engine nacelle comprising:
- an interior portion having a central axis, the interior portion configured to house an engine at least generally aligned with the central axis;
- a forward portion having first and second structural attach points, the first and second structural attach points being offset from each other in a first direction at least generally perpendicular to the central axis, the first and second structural attach points being configured to fixedly attach the engine nacelle to the aircraft and transfer vertical and lateral load components from the engine nacelle to the aircraft, the vertical and lateral load components acting in directions perpendicular to the central axis; and
- a side portion positioned aft of the forward portion and having at least a third structural attach point, the third structural attach point being offset from the first and second structural attach points in a second direction at least generally parallel to the central axis, the third structural attach point being configured to fixedly attach the engine nacelle to the aircraft and transfer an axial load component from the engine nacelle to the aircraft, the axial load component acting in a direction parallel to the central axis.

12. The engine nacelle of claim 11 wherein the first direction is at least generally parallel to the rear wing spar, and wherein the first and second structural attach points are configured to be attached at least proximate to the rear wing spar.

13. The engine nacelle of claim 11 wherein the wing includes an aft deck region extending aft of the rear wing spar, and wherein the third structural attach point is configured to be attached at least proximate to the aft deck region.

14. The engine nacelle of claim 11 wherein the side portion further includes a fourth structural attach point, the fourth structural attach point being configured to fixedly attach the engine nacelle to the aircraft and transfer a vertical load component from the engine nacelle to the aircraft, the vertical load component acting in a direction perpendicular to the central axis.

15. The engine nacelle of claim 11 wherein the first and second structural attach points are single-pin attach points.

16. The engine nacelle of claim 11 wherein the third structural attach point is a single-pin attach point.

17. The engine nacelle of claim 11 wherein the side portion further includes at least a fourth structural attach point and a fifth structural attach point, wherein the fourth and fifth structural attach points are configured to form a couple capable of transferring a bending moment component from the engine nacelle to the aircraft.

18. A system for structurally attaching an engine nacelle to an aircraft, the engine nacelle configured to house an engine at least generally aligned with a central axis, the aircraft having a wing with a trailing edge region and an aft deck region, the aft deck region being positioned inboard of the trailing edge region and extending aft of the trailing edge region, the system comprising:
- means for transferring a torsional load component from the engine nacelle to the wing at least proximate to the trailing edge region of the wing, wherein the torsional load component acts at least generally about the central axis of the engine nacelle; and
- means for transferring a nontorsional load component from the engine nacelle into the wing at least proximate to the aft deck region of the wing, wherein the nontorsional load component acts in a direction at least generally perpendicular to the central axis.

19. The system of claim 18, further comprising means for transferring a thrust load component from the engine into the aft deck region of the wing, the thrust load component acting in a direction at least generally parallel to the central axis.

20. The system of claim 18 wherein the wing of the aircraft includes a wing spar positioned at least proximate to the trailing edge region, and wherein the means for transferring a torsional load component includes means for transferring a torsional load component from the engine nacelle into the wing spar.

21. The system of claim 18 wherein the means for transferring a torsional load component are first means for transferring a first torsional load component, and wherein the system further comprises second means for transferring a second torsional load component from the engine nacelle to the wing at least proximate to the aft deck region of the wing.

22. The system of claim 18 wherein the engine nacelle further includes an aerodynamic control surface extending outwardly from the engine nacelle at least generally perpendicular to the central axis, and wherein the means for transferring a torsional load component from the engine nacelle include means for transferring a torsional load component caused by the control surface.

23. An aircraft comprising:

a wing having a trailing edge region; and an engine nacelle fixedly attached to the wing, the engine nacelle having:

an interior portion having a central axis, the interior portion configured to house an engine at least generally aligned with the central axis;

a forward portion configured to fixedly attach the engine nacelle to the wing and transfer at least approximately all of a torsional load component from the engine nacelle to the wing, the torsional load component acting about an axis at least generally parallel to the central axis; and a side portion configured to fixedly attach the engine nacelle to the wing at least generally aft of the trailing edge region, the side portion being further configured to transfer vertical and lateral load components to the wing, the vertical and lateral load components acting in directions at least generally perpendicular to the central axis.

24. The aircraft of claim 23, further comprising:

a fuselage having a forward portion and an aft portion, wherein the wing is a first wing fixedly attached to the aft portion of the fuselage; and a second wing fixedly attached to the forward portion of the fuselage, the second wing being smaller than the first wing.

25. The aircraft of claim 23 wherein the wing further includes an aft deck region, the aft deck region extending aft of the trailing edge region and inboard of the trailing edge region, and wherein the engine nacelle is fixedly attached to the wing between the trailing edge region and the aft deck region.

26. The aircraft of claim 23, further comprising an inlet positioned forward of the engine nacelle and configured to provide air to the engine.

27. The aircraft of claim 23, further comprising an inlet positioned forward of the engine nacelle and at least generally below the wing, the inlet being configured to provide air to the engine.

28. The aircraft of claim 23 wherein the forward portion of the engine nacelle is fixedly attached at least proximate to a rear wing spar.

29. The aircraft of claim 23 wherein the wing further includes an aft deck region, the aft deck region extending aft of the trailing edge region and inboard of the trailing edge region, wherein the forward portion of the nacelle includes first and second structural attach points fixedly attached at least proximate to the trailing edge region, and wherein the side portion of the nacelle includes a third structural attach point fixedly attached at least proximate to the aft deck region.

30. The aircraft of claim 23 wherein the wing further includes an aft deck region extending aft of the trailing edge region, wherein the forward portion of the nacelle includes first and second structural attach points fixedly attached at least proximate to the trailing edge region, and wherein the side portion of the engine nacelle includes a third structural attach point fixedly attached at least proximate to the aft deck region to transfer a load component acting perpendicular to the central axis from the engine nacelle into the aft deck region.

31. The aircraft of claim 23, further comprising an aerodynamic control surface extending from the engine nacelle at least generally perpendicular to the central axis.

32. A method for structurally attaching an engine nacelle to an aircraft having a wing with a trailing edge region, wherein the engine nacelle includes an interior portion having a central axis, the interior portion configured to house an engine at least generally aligned with the central axis, the method comprising:

attaching first and second structural attach points of a forward nacelle portion to the wing, the first and second structural attach points being offset from each other in a first direction at least generally perpendicular to the central axis, the first and second structural attach points being configured to transfer a torsional load component from the engine nacelle to the wing, the torsional load component acting about an axis at least generally parallel to the central axis; and attaching a third structural attach point of a side nacelle portion to the aircraft aft of the trailing edge region of the wing, the third structural attach point being offset from the first and second structural attach points in a second direction at least generally parallel to the central axis, the third structural attach point being configured to transfer vertical and lateral load components from the engine nacelle to the aircraft, the vertical and lateral load components acting in directions at least generally perpendicular to the central axis.

33. The method of claim 32 wherein the wing includes a rear wing spar, and wherein attaching the first and second structural attach points to the wing includes fixedly attaching the first and second structural attach points at least proximate to the rear wing spar.

34. The method of claim 32 wherein the wing includes an aft deck region extending aft of the trailing edge region and inboard of the trailing edge region, and wherein attaching the third structural attach point to the aircraft includes fixedly attaching the third structural attach point at least proximate to the aft deck region.

35. The method of claim 32, further comprising attaching a fourth structural attach point to the aircraft aft of the trailing edge region of the wing, wherein the fourth structural attach point is configured to transfer an axial load component from the engine nacelle to the aircraft, the axial load component acting in a direction parallel to the central axis.

36. The method of claim 32 wherein attaching the first and second structural attach points to the wing includes making first and second single-pin attachments between the engine nacelle and the wing.

37. The method of claim 32 wherein the wing includes a wing spar and an aft deck region extending aft of the wing spar, and wherein the method further comprises positioning the engine nacelle at least generally aft of the wing spar and adjacent to the aft deck region.

* * * * *

UNITED STATES PATENT AND TRADEMARK OFFICE
CERTIFICATE OF CORRECTION

PATENT NO. : 6,758,439 B2  
DATED : July 6, 2004  
INVENTOR(S) : Galen L. Barefoot It is certified that error appears in the above-identified patent and that said Letters Patent is hereby corrected as shown below:

Column 8,
Line 8, insert -- claims. -- after "appended";

Signed and Sealed this

Thirtieth Day of November, 2004

JON W. DUDAS
*Director of the United States Patent and Trademark Office*